July 21, 1925.
W. J. VOIT
WEATHER STRIP FOR AUTOMOBILE WINDSHIELDS
Filed April 17, 1922
1,546,764
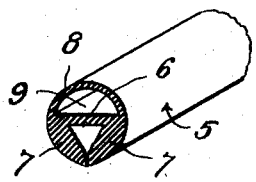
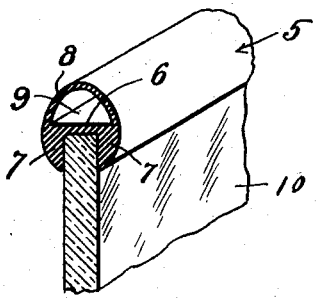
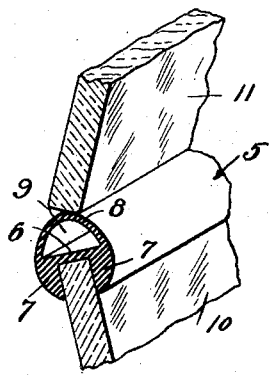
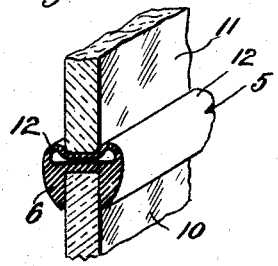
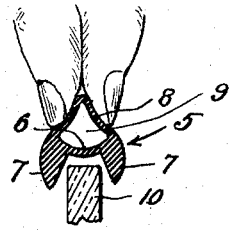
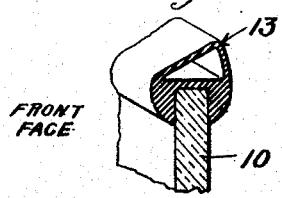
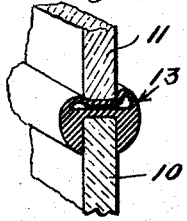
Inventor
William J. Voit Patented July 21, 1925.

1,546,764

UNITED STATES PATENT OFFICE.

WILLIAM J. VOIT, OF HYNES, CALIFORNIA, ASSIGNOR TO GEORGE W. ENO RUBBER COMPANY, OF LOS ANGELES, CALIFORNIA, A CORPORATION OF CALIFORNIA.

WEATHER STRIP FOR AUTOMOBILE WINDSHIELDS.

Application filed April 17, 1922. Serial No. 554,029.

*To all whom it may concern:*

Be it known that I, WILLIAM J. VOIT, a citizen of the United States, residing at Hynes, in the county of Los Angeles and State of California, have invented new and useful Improvements in Weather Strips for Automobile Windshields, of which the following is a specification.

My invention has relation to an improved elastic weather strip adapted for effectively sealing the joint between the wind shield sections.

A main object of my invention is to provide an improved elastic weather strip for automobile wind shields that will at all times effectually seal the joint between the shield sections regardless of the oxidization of the material of which the weather strip is composed and the consequent loss of resiliency.

A further object of my invention is to provide a weather strip construction which may be quickly and effectively detachably secured to the edge of one of the shield sections without the use of tools or other appliances.

A still further object is to provide a weather strip construction which will effectually seal and adjust itself to wind shield joints of varying widths.

Other objects and advantages will be at once apparent from the following description, reference being had to the drawings accompanying the same, in which:—

Fig. 1 is a cross sectional perspective view of a portion of my improved wind shield weather strip.

Fig. 2 is a cross sectional perspective view of a portion of a wind shield weather strip secured in position on a shield section.

Fig. 3 is a cross sectional perspective view of the sections of a wind shield, illustrating the method of securing the strip in weather tight position between the same.

Fig. 4 is a cross sectional perspective view of a sectional wind shield showing the weather strip in a sealed position.

Fig. 5 is a cross section of my improved wind shield weather strip, illustrating the method of attaching the strip to the edge of one of the shield sections.

Fig. 6 is a cross sectional perspective view of a modified form of wind shield weather strip in position on a shield section.

Fig. 7 is a cross sectional perspective view of the form illustrated in Fig. 6, showing the configuration of the strip when the shield sections are in a closed or normal position.

In rubber weather strips designed for sealing joints between wind shield sections oxidization of the rubber by exposure has materially decreased the resiliency and sealing qualities of the strips, oftentimes the oxidized strips being so badly warped or twisted out of shape as to negative their usefulness. This is especially true of rubber weather strips which depend upon a sealing rib in connection with a flanged web which rests between the oppositely disposed edges of the shield sections, both the sealing rib and web becoming so oxidized as to render the sealing of the sections ineffectual.

By means of my improved construction oxidization of the rubber of which my strips are preferably composed will not affect their sealing qualities, as the air chamber interposed between the shield sections will effectually provide against any distortion of the strip.

In the embodiment of my invention as illustrated, 5 designates an elastic weather proof sealing strip, preferably formed of rubber, of the normal configuration as shown in Fig. 1. Strip 5 is composed of a thin web 6, the outer edges of which merge into converging shield gripping flanges 7. Formed integral with web 6 and extending in a direction opposite to flanges 7 is a tubular member 8 semi-circular in cross section, forming with web 6 a longitudinally disposed chamber 9.

The strip 5 is detachably secured to one of the edges of section 10 of the shield by spreading the flanges 7, by merely pinching the tubular member 8 to spread the flanges 7, this method being clearly illustrated in Fig. 5 of the drawings.

It will be understood that when applying the strip to one or the other of the opposing edges of the shield sections the same are swung out of register as clearly shown in Fig. 3, the upper section 11 contacting with the highest point of member 8, the sections 10 and 11 are then swung together into a closed position, as best illustrated in Fig. 4, the member 8 being substantially compressed by the upper section 11 of the shield against the upper surface of the web 8, the degree of compression of member 8 depending entirely upon the width of the joint between the shield sections. When the shield members are in a closed position and member 8 is compressed, the outer portions on either side of the shield section 11 will extend upwardly and beyond the lower transverse edge of section 11 and furnish additional protection against the entrance of water or moisture through the joint formed between the sections.

In Figs. 6 and 7, I have illustrated a modified form of weather strip in which the member 13 is of different form from that illustrated in the preceding figures. In cross section member 13 is of triangular form and the strip is attached to the lower section in the manner illustrated in Fig. 6, the apex of the triangle lying at the front face of shield section 10.

When the strip is attached to the lower section 10 it will only be necessary to swing shield section 11 out of the perpendicular, as the inclined surface of member 13 will permit of a perfect and easy closure of the section, into the compressed position illustrated in Fig. 7.

From the foregoing description it will be at once apparent that I have provided a simple weather strip that may be conveniently and readily attached to one of the movable sections of a glass automobile wind shield, and that by its novel configuration it will readily adapt itself to wind shield joints of varying widths without alterations. Moreover it will be obvious that any oxidization that may take place from constant exposure will not affect the sealing of my strip.

What I claim is:—

1. A wind shield strip for interposing between the meeting edges of the top and bottom panels of a windshield, comprising a strip of deformable material having a cross section approximating a cross section of a tube but having a cross web dividing the strip into an upper hollow crown collapsible when the edge of the shield engages the same and a lower section forming a channel which may be fitted over the edge of the other panel to grip the same.

2. A wind shield strip for interposing between the meeting edges of the top and bottom panels of the wind shield, comprising a strip of deformable elastic material having a cross section approximating a cross section of a tube, but having a cross web dividing the strip into an upper hollow crown collapsible when the edge of the shield engages the same, and two normally converging gripping flanges extending from opposite edges of the same side of the cross web adapted to be fitted over the edge of the other panel and held thereon solely by their own resiliency.

In witness that I claim the foregoing I have hereunto subscribed my name this 24th day of March, 1922.

WILLIAM J. VOIT.